United States Patent
Haugvaldstad et al.

(10) Patent No.: US 12,529,013 B2
(45) Date of Patent: Jan. 20, 2026

(54) INJECTIVITY IMPROVEMENT WITH THIOALCOHOLS

(71) Applicant: Baker Hughes Oilfield Operations LLC, Houston, TX (US)

(72) Inventors: Ole Haugvaldstad, Houston, TX (US); Zhengwei Liu, Houston, TX (US); Scott Lehrer, The Woodlands, TX (US)

(73) Assignee: Baker Hughes Oilfield Operations LLC, Houston, TX (US)

( * ) Notice: Subject to any disclaimer, the term of this patent is extended or adjusted under 35 U.S.C. 154(b) by 0 days.

(21) Appl. No.: 17/990,546

(22) Filed: Nov. 18, 2022

(65) Prior Publication Data

US 2024/0166972 A1    May 23, 2024

(51) Int. Cl.
C11D 3/34    (2006.01)

(52) U.S. Cl.
CPC ......... C11D 3/3427 (2013.01); *C11D 2111/20* (2024.01)

(58) Field of Classification Search
None
See application file for complete search history.

(56) References Cited

U.S. PATENT DOCUMENTS

| | | | |
|---|---|---|---|
| 9,097,093 B1 * | 8/2015 | Frost | E21B 37/06 |
| 2010/0261623 A1 * | 10/2010 | Cassidy | C09K 8/74 558/255 |
| 2011/0028360 A1 | 2/2011 | Jenkins | |
| 2014/0262280 A1 | 9/2014 | Hill | |
| 2018/0282606 A1 * | 10/2018 | Rodgers | C09K 8/528 |
| 2019/0367799 A1 | 12/2019 | Gupta et al. | |
| 2021/0380883 A1 * | 12/2021 | Dhawan | C23F 11/142 |
| 2022/0056331 A1 | 2/2022 | Griffin | |

FOREIGN PATENT DOCUMENTS

| | | | | |
|---|---|---|---|---|
| CA | 2709033 A1 * | 2/2011 | | C02F 5/14 |
| WO | 2022076426 A1 | 4/2022 | | |

OTHER PUBLICATIONS

ISA/KR; International Search Report and Written Opinion for PCT/US2023/080097, Mar. 22, 2024, 9 pages.

* cited by examiner

*Primary Examiner* — Kaj K Olsen
*Assistant Examiner* — Arlyn I Rivera-Cordero
(74) *Attorney, Agent, or Firm* — Crowe & Dunlevy, P.C.

(57) ABSTRACT

Thioalcohols are useful for dissolving and removing aldehyde-containing deposits from conduit and/or volumes that are clogged or blocked by the aldehyde-containing deposits, and also to prevent or inhibit aldehydes from polymerizing or otherwise forming aldehyde-containing deposits within conduits and/or volumes.

15 Claims, 6 Drawing Sheets

INJECTIVITY IMPROVEMENT WITH THIOALCOHOLS

TECHNICAL FIELD

The present invention relates to methods for removing deposits and blockages from conduits (e.g., pipes, lines, tubes, wellbores, etc.) and/or volumes (e.g., tanks, units, reservoir areas near wellbores, etc.), and more particularly relates to methods for removing deposits and blockages of aldehyde-containing deposits within conduits and/or volumes.

BACKGROUND

In industrial water treatment facilities and oil field production processing facilities, glutaraldehyde and other aldehyde species are used as biocides. In particular, 1,4-glutaraldehyde is a highly effective biocide because it can penetrate into the cell walls of microorganisms, such as algae and produce a chemical crosslinking effect with microbial proteins causing the microbial eggs to solidify, prevent their metabolism, and thereby inhibit the production of bacteria.

Glutaraldehyde is an organic compound with the formula $(CH_2)_3(CHO)_2$. The molecule consists of a five-carbon chain doubly terminated with formyl (CHO) groups. It is usually used as a solution in water and such solutions exist as a collection of hydrates, cyclic derivatives, and condensation products, several of which interconvert. Because the molecule is bifunctional, even as it hydrates, it can function as a crosslinking agent. Crosslinking rigidifies and deactivates many biological functions, so glutaraldehyde solutions are used as biocides as previously described.

However, because glutaraldehyde functions as a crosslinking agent, it can also polymerize with itself or crosslink with other organic molecules or species to form solids. Additionally, glutaraldehyde and other aldehydes can react and interact with other molecules and species to form aldehyde-containing deposits. Consequently, when glutaraldehyde is introduced into pipelines, flowlines, production tubing, wellbores, and other conduits, as well as headers, reservoirs, and other volumes, it can polymerize, react, or interact or solidify to partially or fully obstruct, block, and clog the conduit and/or volume. In industrial water treatment operations and or drilling, fracking, well intervention and production operations for oil and gas, these blockages and clogs can cause significant delays, and in extreme circumstances can be dangerous.

It would be desirable if methods and compositions could be devised to remove obstructions and blockages caused by aldehyde-containing deposits, and also to prevent or inhibit the aldehyde from solidifying, reacting, interacting, or polymerizing in the first place.

SUMMARY

There is provided, in one form, a method for at least partially removing aldehyde-containing deposits or solid incorporating aldehydes in a conduit and/or volume that includes injecting at least one thioalcohol into the conduit and/or volume an amount effective to at least partially remove the aldehyde-containing deposits from the conduit and/or volume, contacting the aldehyde-containing deposits with the thioalcohol for an amount of time to at least partially dissolve the aldehyde-containing deposits, and at least partially removing the dissolved aldehyde-containing deposits from the conduit and/or volume.

There is additionally provided in a different non-limiting embodiment a method for inhibiting or preventing the formation of an aldehyde-containing solid in a conduit and/or volume, where the method includes injecting at least one thioalcohol solvent into the conduit and/or volume within close time proximity to injecting at least one aldehyde into the conduit or volume, where the at least one thioalcohol solvent is injected in an amount effective to inhibit or prevent the aldehyde from forming solids within the conduit and/or volume.

There is further provided in another non-limiting embodiment a remnant composition having water, dissolved aldehyde-containing deposits, and at least one thioalcohol.

DETAILED DESCRIPTION

It has been discovered that thioalcohol solvents can dissolve aldehyde-containing deposits in contaminated and obstructed pipelines, flowlines, headers, production tubing, near wellbore regions and reservoirs to improve the injectivity when aldehydes are used as biocides in these conduits and volumes. In other words, a goal of the method herein is to improve the injectivity of production fluids that could contain these water streams through piping, reservoirs, and the like. Currently such deposits and blockages in production tubing are conventionally removed mechanically by well intervention. Chokes are mechanically cleaned as needed, but results in injection downtime. Pipelines which have pigging possibilities can have deposits scraped out, and then removed from the pig receiver. There are disadvantages to all of these conventional methods.

Water treatment facilities, oil and gas exploration and recovery operations, and other processes include deploying glutaraldehyde and other aldehyde species as biocides to kill algae, bacteria, plant material, and other living cells that can grow and clog conduits and volumes in these operations. Aldehydes such as glutaraldehyde are also used to prevent these cells from growing and causing blockages in the first place.

A risk of using aldehydes as biocides is that they can polymerize with themselves or polymerize, react with, or interact with other organic species to cause deposits which in can also create blockages and inhibit or prevent the operations of concern, which can ultimately result in loss of injectivity, and can also limit and/or block access to a well for a well intervention. Other organic molecules or species that form solids with aldehydes either by polymerization, reaction, or other interaction, include, but are not necessarily limited to, those containing one or more hydroxyl groups. Aldehyde condensation polymers are built up in condensation reactions involving an aldehyde. The reactions by which these compounds are built up into polymers are referred to as condensation reactions because they are usually accompanied by the release of water and other by-products. The resultant polymers—known as phenol-formaldehyde resin, urea-formaldehyde resin, and melamine-formaldehyde resin—are widely used as adhesives in plywood and other structural wood products when intentionally formed in industrial applications. Other examples of aldehyde-containing deposits include aldehyde interactions with and/or reactions with polyvinyl alcohols, polysaccharides, cyclodextrins, and the like. It will be understood that the methods described herein are not limited by the mechanism that forms the solids or blockages. It will be appreciated that the concerns about aldehyde-containing deposits apply to pipelines, flowlines, production tubing, wellbores, valves, and conduits of all kinds as well as headers, reservoirs, and other volumes or equipment through which water and the aldehyde biocides may pass, regardless of other species and components that may also be transmitted through this equipment.

Aldehydes which can serve as biocides, but which can also self-polymerize under certain conditions and cause blockages and obstructions include, but are not necessarily limited to, formaldehyde, glyoxal, glutaraldehyde, cinnamaldehyde, ortho-phthalaldehyde, malonaldehyde, succinaldehyde, adipaldehyde, and combinations thereof. In a particular non-restrictive version of the method, the aldehyde is 2,4-glutaraldehyde (CAS No. 111-30-8).

The method described herein provides fast and complete dissolution of these aldehyde-related polymer solids or blockages and can restore and increase water injectivity. Alternatively, the thioalcohol solvent can prevent or inhibit the aldehyde from polymerizing to begin with. Suitable thioalcohols in the thioalcohol solvent include, but are not necessarily limited to, compounds having the formula HS—X in which X is a heteroatom substituted alkyl, cycloalkyl, aryl, and/or alkyl aryl group, where the heteroatom is selected from the group consisting of oxygen, sulfur, phosphorous, nitrogen, and combinations thereof, where the alkyl, cycloalkyl, aryl, or alkylaryl groups have from 1 to 12 carbon atoms; alternatively from 2 independently to 6 carbon atoms. As used herein with respect to a range, "independently" means that any threshold given may be used together with any other threshold given to provide a suitable alternative range. Non-limiting examples of thioalcohols falling within this formula that are effective in dissolving aldehyde-containing deposits when in contact with the aldehyde-containing deposits include 2-mercaptoethanol, bis(2-mercaptoethyl) sulfide, 2-mercaptoethyl disulfide, 1,8-di-mercapto-3,6-dioxaoctane, mercaptoacetic acid, glyceryl monothioglycolate, 2-mercaptophenol, 4-mercaptophenol, 1,2-dithioethane, cysteamine, N,N-dimethyl cysteamine, N,N'-bis(2-mercaptoethyl) ethylene-diamine, thiolactic acid, 1,3,5-triazine-2,4,6-trithiol, and combinations thereof. In one non-limiting embodiment, the solvent to be applied to the aldehyde-containing deposits may be comprised of one or more of these thioalcohols compounds. In a particular non-restrictive version of the method, the thioalcohol is 2-mercaptoethanol (2ME).

The thioalcohol solvent can be applied in neat form or premixed with another solvent such as water and/or an alcohol. Water, alcohols, and other compatible solvents with water and/or alcohols may be used as a co-solvent together with the thioalcohols described herein. Suitable specific alcohol solvents include, but are not necessarily limited to, glycols (e.g., ethylene glycol, propylene glycol, and the like), methanol, isopropyl alcohol (IPA), ethers (e.g., ethylene glycol mono-methyl ether, ethylene glycol monobutyl ether (EGMBE), etc.), and combinations thereof.

The amount of thioalcohol used depends on the severity of the aldehyde-containing deposits being treated and given reasonable treatment time. In the embodiment for removing aldehyde-containing deposits, the thioalcohol solvent will typically be introduced only after the aldehyde-containing deposits have formed. It is difficult to predict or estimate a dosage range in actual applications because the solids/deposits from the aldehyde polymerization are deposited in or incorporated near or in a subterranean formation close to aldehyde injection sites, in the non-limiting case of a wellbore or the formation near the wellbore. Similar difficulties arise with predicting or estimating a dosage range in conduits and volumes, in the non-restrictive instance of water treatment facilities. In summary, it is hard to estimate how much aldehyde-containing deposits there is. The dosage or amount of thioalcohol solvent is certainly based on the amount of aldehyde used, but other factors involved include, yet are not necessarily limited to, the degree of polymerization, time and conditions, and accompanying solids that may be co-deposited, such as from inorganic materials including, but not necessarily limited to, calcium carbonate and/or inorganic scales, and also potential organic deposits including, but not necessarily limited to, asphaltenes, waxes, or other types of organic fouling materials. All of these considerations would affect the total volume or ratio of thioalcohol solvent used and contact time. In one non-limiting embodiment, the thioalcohol solvent is used until the blockage is remediated.

While currently identified implementations of the method have been at temperatures of about 24° C. or less, it is expected that environments where the temperature is above this range would accelerate the solubilization process. In some non-limiting embodiments, an upper temperature limit of about 150° C. may apply; because some thioalcohols, such as 2-mercaptoethanol, breakdown above that temperature, however other thioalcohols may have higher temperature stability limit.

In one non-limiting embodiment, the amount of time that the aldehyde-containing deposits is contacted with the thioalcohol solvent is whatever amount of time necessary to remove the aldehyde-containing deposits from the conduit and/or volume to the extent that functionality is restored to the conduit or volume. While it is certainly desirable to completely remove the aldehyde-containing deposits, the method may be considered successful if the aldehyde-containing deposits is partially removed to the extent necessary to restore functionality. Suitable time frames may range from about 1 hour independently to about one year or more, alternatively from about 12 hours to about six months or more; in another non-limiting embodiment from about 2 days to about 90 days or more. In a different non-restrictive embodiment injection of and contacting with the thioalcohol may be continuous and of an indefinite time period.

The resulting composition after treatment may be understood to be a "remnant composition" that includes the dissolved aldehyde-containing deposits, water, and the thioalcohol solvent. This is flushed away, typically with water, but also other fluids, to remove the remnants of the aldehyde-containing deposits or pushed further away into the formation, where it can be less problematic.

In a different non-limiting embodiment, the thioalcohol solvent can be used to inhibit or prevent the polymerization of the aldehyde in the first place. In this case, the thioalcohol solvent can be applied or injected before, at the same time as, or after the aldehyde is introduced. It has been demonstrated experimentally that thioalcohols are compatible with glutaraldehyde products and can delay the polymerization or solid formation of glutaraldehyde. In one test, it was shown that without thioalcohol, glutaraldehyde can polymerize and form solids or precipitates within minutes when pH increased. In a case where about 10 vol % thioalcohol was added (based on the amount of glutaraldehyde), no polymerization was observed when the same pH increase occurred. It is expected that that all three sequences of additions or introductions would be effective in inhibiting or preventing aldehyde polymerization. Again, it is not necessary for complete polymerization prevention to occur for the method to be considered effective, so long as operation of the conduit and/or volume is not adversely affected.

It will be appreciated that there are multiple mechanisms for polymerizing the aldehydes other than a pH increase. Additionally, there are other processes that can cause the formation of solids with aldehydes other than polymerization. The thioalcohols described herein can prevent or remove aldehyde-containing deposits regardless of whether the deposits are formed by polymerization or another mechanism.

As a preventative or inhibiting method, the thioalcohol solvent can be applied at a much lower dosage or ratio compared to the embodiment where thioalcohol solvent is used to remove the already-polymerized aldehyde-containing deposits. In one non-limiting embodiment, the volume ratio of thioalcohol to aldehyde may range from about 0.1 vol % independently to about 20 vol %; alternatively, from about 2 vol % independently to about 10 vol % thioalcohol to aldehyde.

The method and compositions described herein will now be discussed with reference to certain specific Examples which are intended to further illustrate, but not necessarily limit the method and the compositions.

EXAMPLES

Laboratory dissolution tests performed on laboratory-made glutaraldehyde solids/deposits showed that 2-mercaptoethanol dissolves these solids within less than 30 minutes. It was also shown that 2-mercaptoethanol can dissolve solid samples obtained from production tubing of a well suffering from a aldehyde-containing deposits obstruction. It is believed that other thioalcohols can have similar dissolution capability.

More specifically, six bottles each containing about 0.7 grams of solids, namely a black, sticky material from a North Sea oilfield, were each treated at room temperature with 5 ml of a solvent. The solvents are identified in Table I.

TABLE I

Solvents Used in Examples 1-6

| Ex. | Solvent |
|---|---|
| 1 | Incumbent Mixture of heavy aromatic naphtha and solvent of glycol ether derivatives |
| 2 | Mutual solvent product of glycol ether derivatives |
| 3 | 2-mercaptoethanol and water |
| 4 | 2-mercaptoethanol |
| 5 | 50 vol % 2-mercaptoethanol/50 vol % mutual solvent product of glycol ether derivatives |
| 6 | ⅓ vol % 2-mercaptoethanol/⅓ vol % mutual solvent product of glycol ether derivatives/⅓ vol % deionized water |

Figure 1:
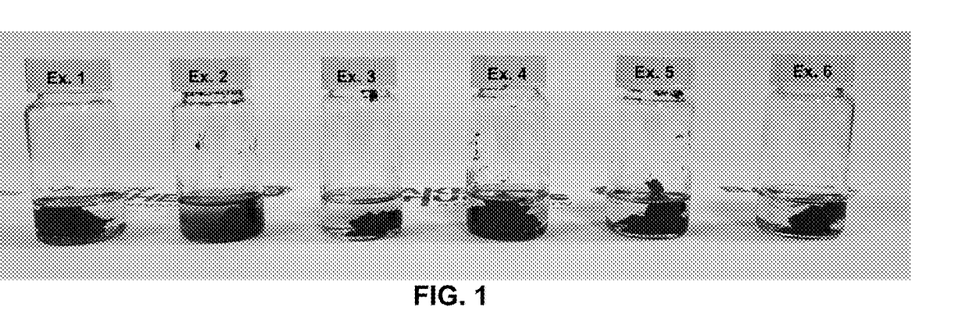
FIG. 1 is a photograph of six bottles partially containing polymerized glutaraldehyde and solutions of different solvents for Examples 1-6, respectively, immediately after the solvent additions.
Figure 2:
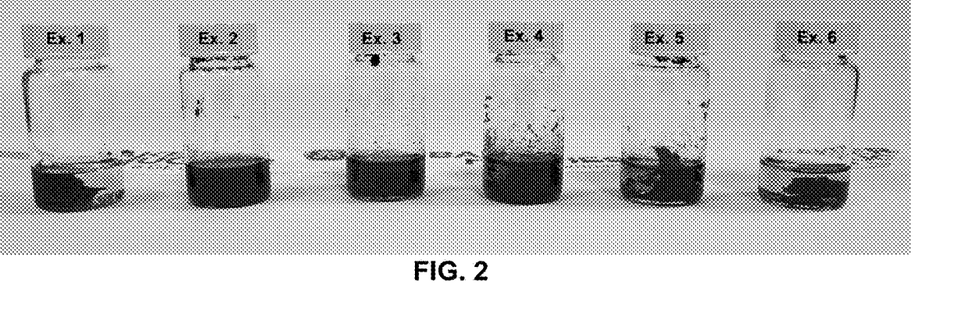
FIG. 2 is a photograph of the six bottles shown in FIG. 1 one hour after the solvent additions.
Figure 3:
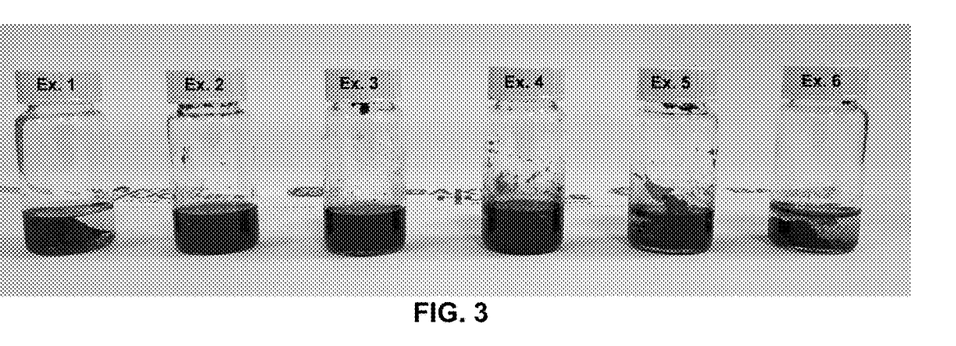
FIG. 3 is a photograph of the six bottles shown in FIG. 1 two hours after the solvent additions.
Figure 4:
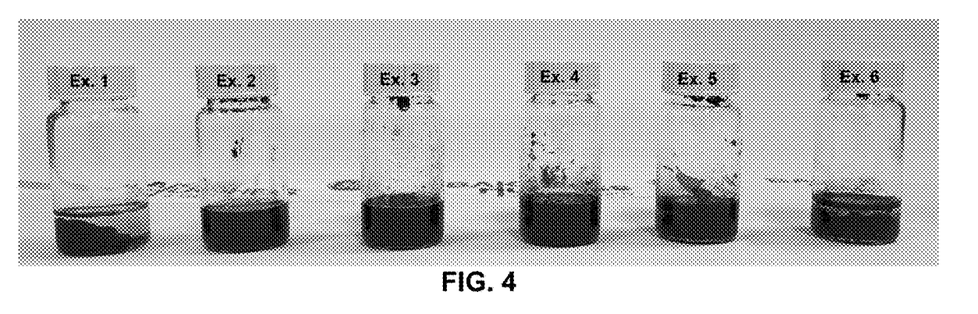
FIG. 4 is a photograph of the six bottles shown in FIG. 1 twenty-four (24) hours after the solvent additions.

FIG. 1 is a photograph of six bottles partially containing polymerized glutaraldehyde and solutions of different solvents for Examples 1-6, respectively, immediately after the solvent additions where there has been no time for dissolution. The bottles were stationary and gently swirled before the photographs were taken. FIG. 2 is a photograph of the six bottles shown in FIG. 1 one hour after the solvent additions. FIG. 3 is a photograph of the six bottles shown in FIG. 1 two hours after the solvent additions. FIG. 4 is a photograph of the six bottles shown in FIG. 1 twenty-four (24) hours after the solvent additions.

Figure 5:
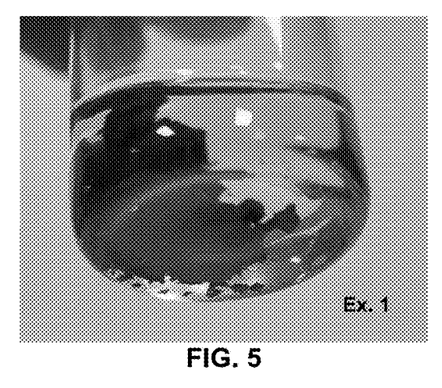
FIG. 5 is a more detailed photograph of the bottle of Example 1 twenty-four hours after the solvent addition.
Figure 6:
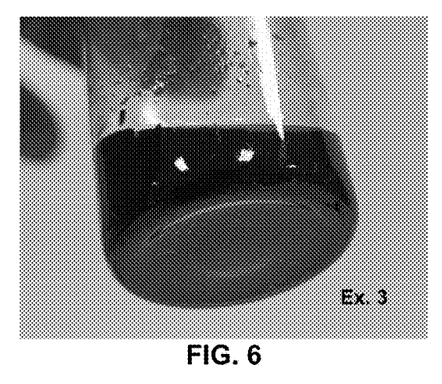
FIGS. 6 and 7 are more detailed photographs of the bottle of Example 3 twenty-four hours after the solvent addition.
Figure 7:
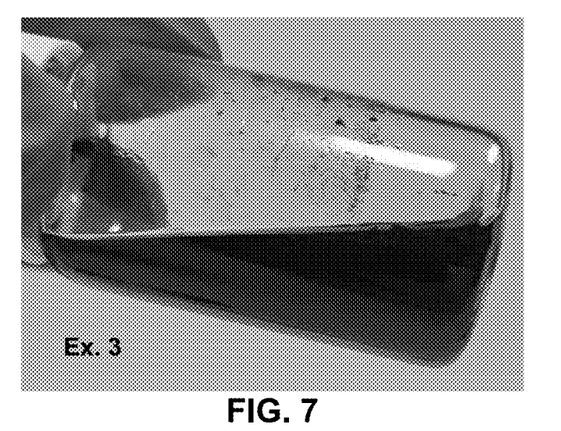
Figure 8:
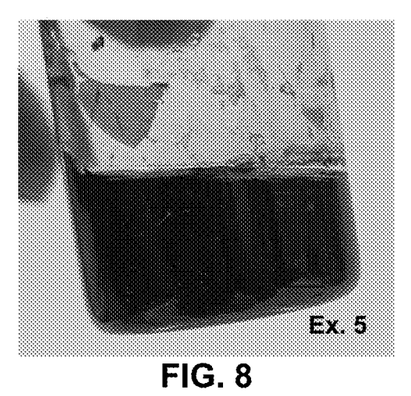
FIGS. 8 and 9 are more detailed photographs of the bottle of Example 5 twenty-four hours after the solvent addition.
Figure 9:
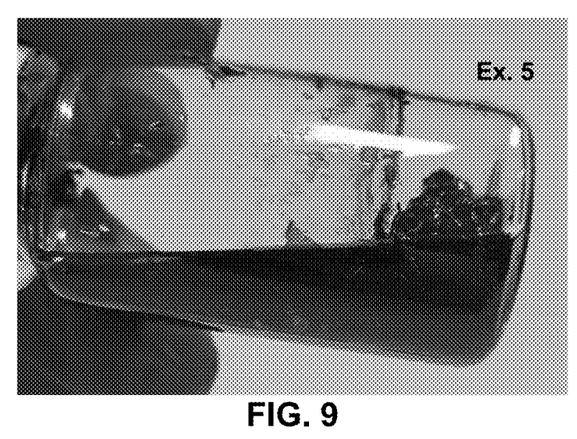
Figure 10:
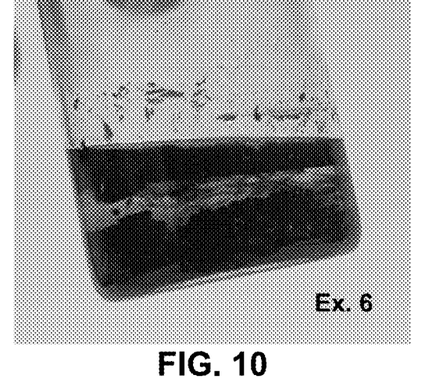
FIGS. 10 and 11 are more detailed photographs of the bottle of Example 6 twenty-four hours after the solvent addition.
Figure 11:
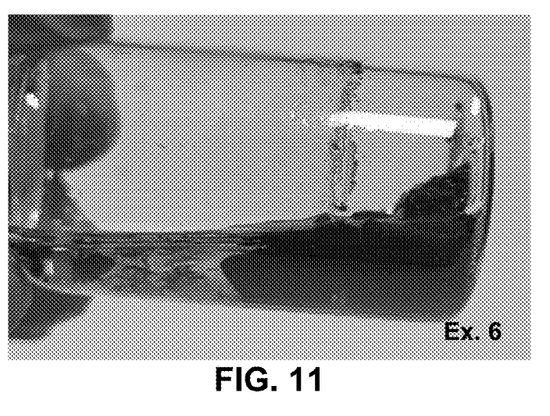
Figure 12:
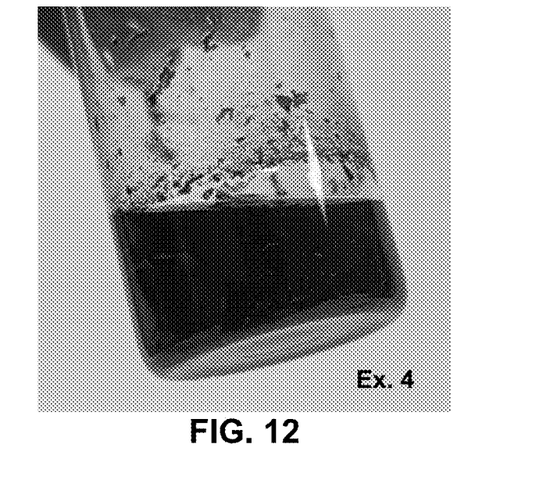
FIGS. 12 and 13 are more detailed photographs of the bottle of Example 4 twenty-four hours after the solvent addition.
Figure 13:
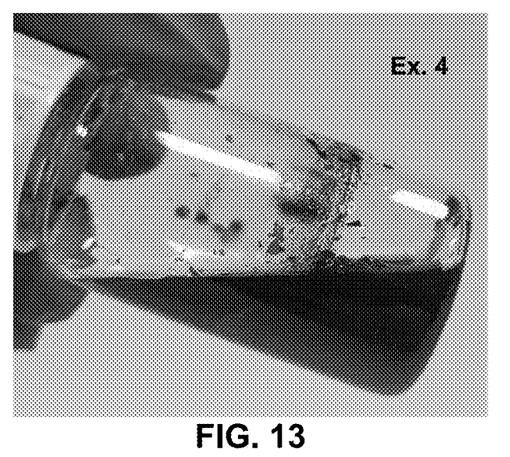
Figure 14:
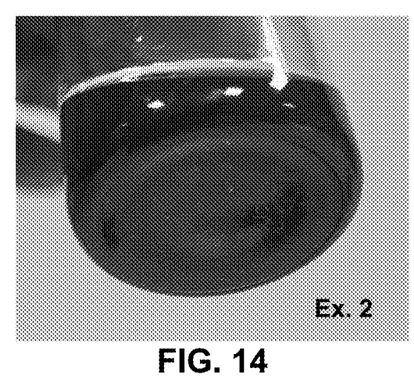
FIGS. 14 and 15 are more detailed photographs of the bottle of Example 2 twenty-four hours after the solvent addition.
Figure 15:
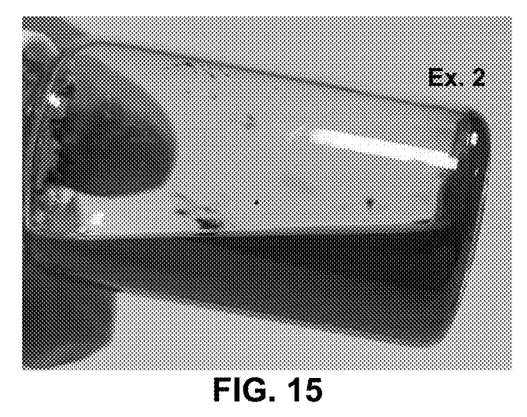

FIG. 5 is a more detailed photograph of the bottle of Example 1 twenty-four hours after the solvent addition. FIGS. 6 and 7 are more detailed photographs of the bottle of Example 3 twenty-four hours after the solvent addition. FIGS. 8 and 9 are more detailed photographs of the bottle of Example 5 twenty-four hours after the solvent addition. FIGS. 10 and 11 are more detailed photographs of the bottle of Example 6 twenty-four hours after the solvent addition. FIGS. 12 and 13 are more detailed photographs of the bottle of Example 4 twenty-four hours after the solvent addition. FIGS. 14 and 15 are more detailed photographs of the bottle of Example 2 twenty-four hours after the solvent addition.

In general, the desired result was that the solvent would completely dissolve the polymerized glutaraldehyde so that no solids were present in the bottle. Even if all of the solid was not dissolved, if most of the solids were dissolved and the liquid appeared homogeneous with little or no solids, this was a desirable result because it indicated that the polymerized glutaraldehyde was largely removed and could be flushed away with water.

The solvent of Example 1 did not appear to have much effect. The solvent of Example 3 (2-mercaptoethanol and water) gave the best results, whereas the solvents of Example 4 and Example 2 were essentially equivalent as giving the next-best results.

Figure 16:
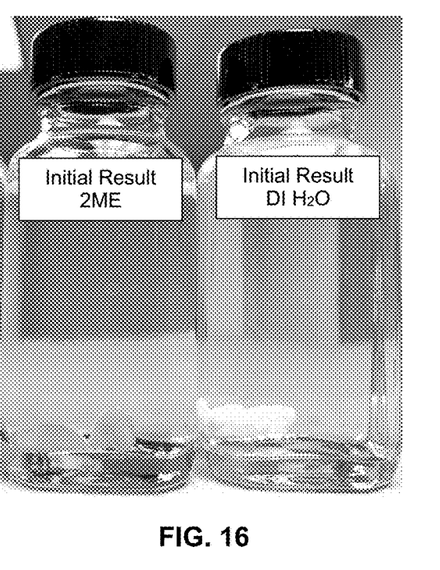
FIG. 16 is a photograph of two bottles containing solids that were polymerized by increasing the pH of glutaraldehyde just after introducing 2-mercaptoethanol into the bottle on the left and deionized water into the bottle on the right side.
Figure 17:
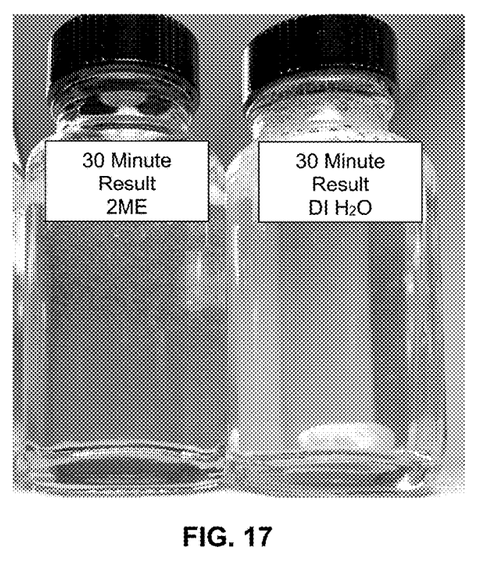
FIG. 17 is a photograph of the two bottles in FIG. 16 after 30 minutes where the solids in the bottle on the left have dissolved.

FIGS. 16 and 17 present the results of Example 7. Aldehyde-containing deposits were formed by polymerizing 2,4-glutaraldehyde by increasing the pH of the solution. About 2 grams of this polymer solid were added into each glass bottle for further testing. In FIG. 16, about 100 ml of 2-mercaptoethanol and water equal part mixture was added to the bottle on the left and 100 ml of deionized water was added to the bottle on the right. The bottles were gently swirled just before the photo of the Initial Result was taken. FIG. 17 is a photograph of the bottles of FIG. 16 after 30 minutes with no additional swirling or mixing. It may be seen that the aldehyde-containing deposit in the bottle on the left with 2ME is completely dissolved whereas the deposit in the bottle on the right still remains. Thus, aldehyde-containing deposits formed by laboratory-induced polymerization of glutaraldehyde can be dissolved with the present method using a thioalcohol.

In the foregoing specification, the method has been described with reference to specific embodiments thereof and has been shown as effective in providing a method for dissolving aldehyde-containing deposits.

It will be evident that various modifications and changes can be made to the methods and compositions described herein without departing from the broader scope of the invention as set forth in the appended claims. Thus, the specification is to be regarded in an illustrative rather than a restrictive sense. For example, specific aldehyde-containing deposits, thioalcohol solvents, other solvents, conduits, volumes, ratios, dosages, orders of addition, proportions, and time periods thereof falling within the claimed parameters, but not specifically identified or tried in a particular method or composition to dissolve and/or prevent or inhibit aldehyde-containing deposits, are expected to be within the scope of this application.

The present application may suitably comprise, consist, or consist essentially of the elements disclosed and may be practiced in the absence of an element not disclosed. For instance, the method for at least partially removing a aldehyde-containing deposits in a conduit and/or volume comprises, consists essentially of, or consists of injecting at least one thioalcohol solvent into the conduit and/or volume an amount effective to at least partially remove the aldehyde-containing deposits from the conduit and/or volume, contacting the aldehyde-containing deposits with the thioalcohol solvent for an amount of time to at least partially dissolve the aldehyde-containing deposits, and at least partially removing the dissolved aldehyde-containing deposits from the conduit and/or volume.

Further there may be provided a method for inhibiting or preventing the formation of an aldehyde-containing deposit in a conduit and/or volume where the method comprises, consists essentially of, or consists of injecting at least one thioalcohol solvent into the conduit and/or volume within close time proximity to injecting at least one aldehyde into the conduit or volume, where the at least one thioalcohol solvent is injected in an amount effective to inhibit or prevent the formation of the aldehyde-containing deposit from polymerizing within the conduit and/or volume.

There may be further provided a remnant composition comprising, consisting essentially of, or consisting of dissolved aldehyde-containing deposits, water, and at least one thioalcohol solvent.

As used herein, the terms "comprising," "including," "containing," "characterized by," and grammatical equivalents thereof are inclusive or open-ended terms that do not exclude additional, unrecited elements or method acts, but also include the more restrictive terms "consisting of" and "consisting essentially of" and grammatical equivalents thereof. As used herein, the term "may" with respect to a material, structure, feature, or method act indicates that such is contemplated for use in implementation of an embodiment of the disclosure and such term is used in preference to the more restrictive term "is" so as to avoid any implication that other, compatible materials, structures, features, and methods usable in combination therewith should or must be, excluded.

As used herein, the singular forms "a," "an," and "the" are intended to include the plural forms as well, unless the context clearly indicates otherwise.

As used herein, the term "and/or" includes any and all combinations of one or more of the associated listed items.

As used herein, relational terms, such as "first," "second," "top," "bottom," "upper," "lower," "over," "under," etc., are used for clarity and convenience in under-standing the disclosure and do not connote or depend on any specific preference, orientation, or order, except where the context clearly indicates otherwise.

As used herein, the term "substantially" in reference to a given parameter, property, or condition means and includes to a degree that one of ordinary skill in the art would understand that the given parameter, property, or condition is met with a degree of variance, such as within acceptable manufacturing tolerances. By way of example, depending on the particular parameter, property, or condition that is substantially met, the parameter, property, or condition may be at least 90.0% met, at least 95.0% met, at least 99.0% met, or even at least 99.9% met.

As used herein, the term "about" in reference to a given parameter is inclusive of the stated value and has the meaning dictated by the context (e.g., it includes the degree of error associated with measurement of the given parameter).

What is claimed is:

1. A method for preventing formation of aldehyde-containing deposits in a conduit and/or volume comprising:
   introducing an aldehyde into the conduit and/or volume, where polymerization of the aldehyde would form the aldehyde-containing deposits; and
   injecting a thioalcohol solvent into the conduit and/or volume in an amount effective to prevent the formation of the aldehyde-containing deposits within the conduit and/or volume due to polymerization of the aldehyde.

2. The method of claim 1, where the aldehyde is selected from the group consisting of formaldehyde, glyoxal, glutaraldehyde, cinnamaldehyde, ortho-phthalaldehyde, malonaldehyde, succinaldehyde, adipaldehyde, and combinations thereof.

3. A method for preventing formation of aldehyde-containing deposits in a conduit and/or volume comprising:
   introducing at least one aldehyde into the conduit and/or volume, where polymerization of the at least one aldehyde would form the aldehyde-containing deposits, where the at least one aldehyde is selected from the group consisting of formaldehyde, glyoxal, cinnamaldehyde, ortho-phthalaldehyde, malonaldehyde, succinaldehyde, adipaldehyde, and combinations thereof; and
   injecting at least one thioalcohol solvent into the conduit and/or volume in an amount effective to prevent the formation of the aldehyde-containing deposits within the conduit and/or volume due to polymerization of the at least one aldehyde.

4. The method of claim 3 where the volume amount of thioalcohol in the at least one thioalcohol solvent ranges from about 0.1 vol % to about 20 vol % based on the amount of the at least one aldehyde within the conduit and/or volume.

5. The method of claim 3 where the method is practiced at a temperature of about 150° C. or below.

6. The method of claim 3, wherein the step of injecting the at least one thioalcohol solvent into the conduit and/or volume further comprises the step of continuously injecting the at least one thioalcohol solvent into the conduit and/or volume for a time frame ranging from one hour to one year.

7. The method of claim 3, where the step of injecting the at least one thioalcohol solvent into the conduit and/or volume is performed before the step of introducing the at least one aldehyde into the conduit and/or volume.

8. The method of claim 3, wherein the step of injecting the at least one thioalcohol solvent into the conduit and/or volume is performed at the same time as the step of introducing the at least one aldehyde into the conduit and/or volume.

9. The method of claim 3, further comprising the step of formulating the at least one aldehyde as a biocide to kill algae, bacteria, plant material, or other living cells.

10. The method of claim 3 where the at least one thioalcohol solvent comprises a thioalcohol selected from the group consisting of compounds having the formula HS—X in which X is a heteroatom substituted alkyl, cycloalkyl, aryl, and/or alkylaryl group, where the heteroatom is selected from the group consisting of oxygen, sulfur, phosphorous, nitrogen, and combinations thereof, where the alkyl, cycloalkyl, aryl, or alkylaryl groups have from 1 to 12 carbon atoms.

11. The method of claim 10, wherein the at least one thioalcohol is selected from the group consisting of 2-mercaptoethanol, bis(2-mercaptoethyl) sulfide, 2-mercaptoethyl disulfide, 1,8-dimercapto-3,6-dioxaoctane, mercaptoacetic acid, glyceryl monothioglycolate, 2-mercaptophenol, 4-mercaptophenol, 1,2-dithioethane, cysteamine, N,N-dimethyl cysteamine, N,N'-bis(2-mercaptoethyl) ethylene-diamine, thiolactic acid, 1,3,5-triazine-2,4,6-trithiol, or a combination thereof.

12. The method of claim 3, further comprising the step of mixing the at least one thioalcohol with a co-solvent to obtain the thioalcohol solvent.

13. The method of claim 12, wherein the at least one thioalcohol is 2-mercaptoethanol and the co-solvent is water.

14. The method of claim 12, wherein the co-solvent is an alcohol selected from the group consisting of glycols, methanol, isopropyl alcohol, ethers, and combinations thereof.

15. The method of claim 14, wherein the glycol is selected from the group consisting of ethylene glycol and propylene glycol and the ether is selected from the group consisting of ethylene glycol mono-methyl ether and ethylene glycol monobutyl ether.

* * * * *